United States Patent

Yasuda et al.

[11] Patent Number: 5,839,089
[45] Date of Patent: Nov. 17, 1998

[54] THUNDER CLOUD OBSERVATION SYSTEM

[75] Inventors: Kazuhiro Yasuda, Tokyo; Yuko Sato, Yokohama; Takashi Murano; Hiroshi Oikawa, both of Kawasaki, all of Japan

[73] Assignee: Kabushiki Kaisha Toshiba, Kawasaki, Japan

[21] Appl. No.: 546,449

[22] Filed: Oct. 20, 1995

[30] Foreign Application Priority Data

Oct. 20, 1994 [JP] Japan .................................. 6-255126

[51] Int. Cl.⁶ .................................................. G01W 1/10
[52] U.S. Cl. .......................................... 702/3; 73/170.16
[58] Field of Search ........................ 73/170.16; 324/640; 342/26; 364/400, 420; 702/2, 3, 4

[56] References Cited

U.S. PATENT DOCUMENTS

| | | | |
|---|---|---|---|
| 2,606,443 | 8/1952 | Gilman | 73/170.16 |
| 2,736,020 | 2/1956 | Atlas | 342/26 |
| 2,859,437 | 11/1958 | Atlas | 342/26 |
| 3,050,723 | 8/1962 | Atlas | 342/26 |
| 3,116,482 | 12/1963 | Kessler, III | 342/26 |
| 3,149,332 | 9/1964 | Kocher | 342/26 |
| 3,302,200 | 1/1967 | Atlas | 342/26 |
| 4,660,038 | 4/1987 | Greneker, III | 342/26 |
| 5,438,334 | 8/1995 | Anderson | 342/26 |
| 5,440,483 | 8/1995 | Badoche-Jacquet et al. | 364/420 |
| 5,526,676 | 6/1996 | Solheim et al. | 324/640 X |
| 5,583,972 | 12/1996 | Miller | 342/26 X |
| 5,717,589 | 2/1998 | Thompson et al. | 702/3 |

FOREIGN PATENT DOCUMENTS

| | | |
|---|---|---|
| 7 110378 | 4/1995 | Japan . |
| 7 110379 | 4/1995 | Japan . |
| 7 110385 | 4/1995 | Japan . |

Primary Examiner—Edward R. Cosimano
Attorney, Agent, or Firm—Oblon, Spivak, McClelland, Maier & Neustadt, P.C.

[57] ABSTRACT

In the thunder cloud observation system of the present invention, the vertical direction accumulated water content (VIL) is calculated by the VIL arithmetic operation unit from echo strength data obtained by the climate radar, the echo peak temperature is obtained by the echo peak temperature arithmetic operation unit with reference to altitude-temperature comparison data on the basis of high atmospheric climate data, the precipitation area is determined by the area determination unit from the VIL data, and the thunder cloud area generated within the precipitation area is identified from the echo peak temperature data. The thunder cloud area determined by the area determination unit is subjected to the correlation processes in terms of distance and overlapping area by the identification/tracking process unit, thus performing the identification/tracking, and the results of the processes of the area judgment unit and the identification/tracking process unit are displayed in the image display unit. Therefore, even a thunder cloud area regionally generated within a cloud expanding at a relative low altitude can be identified, and the area thereof can be detected and tracked.

6 Claims, 7 Drawing Sheets

THUNDER CLOUD OBSERVATION SYSTEM

BACKGROUND OF THE INVENTION

1. Field of the Invention

The present invention relates to a thunder cloud observation system used for forecasting the occurrence of a thunderbolt by observing a thunder cloud using a radar echo.

2. Description of the Related Art

As is well-known, electric power facilities are easily damaged by a thunderbolt, and the most of the accidents of facilities are caused by the striking of a thunderbolt. In order to prevent an accident caused by a thunderbolt and quickly recover the normal operation, it is very important to forecast the place, time and strength of the occurrence of the thunderbolt. Under these circumstances, a thunder cloud observation system capable of distinguishing thunder cloud from rain cloud by radar echo, and outputting an alarm on the basis of the determination of a probability of the occurrence of a thunderbolt before the striking of the thunderbolt actually takes place.

In the course of developments of the thunder cloud observation system, the method in which a cloud, the echo strength of which is measured to be no less than a reference level while the cloud is measured to be located at a reference height or higher, in each observation by the radar echo, is judged to be a thunder cloud, was conventionally considered effective. However, as in the case of clouds which appear in winter in the Japan Sea side, that is, snow clouds widely expanding at a low altitude, a portion of which is developed slightly stronger than the surrounding thereof, thereby causing a thunderbolt, in some cases. With the above-described method, it is very difficult to make a judgment of thunder cloud regarding such a low cloud. Further, even if it can be judged as a thunder cloud, it is still difficult to identify which area of the largely expanding cloud is a thunder cloud area.

In addition, clouds are always moving and changing their shape, whereas the radar echo can only be obtained at a constant time interval. Therefore, with the above-described thunder cloud observation system, it is necessary to identify and track the thunder cloud of each and every observation separately. Under such circumstances, it is proposed that a cloud which is conventionally judged to be a thunder cloud, is subjected to a correlation process where the degree of overlapping in terms of area, is used as an index, so as to judge an identity.

However, in the case of those of the above-mentioned snow clouds, it is very difficult to identify the thunder cloud area within each cloud, and therefore the correlation process by the above method cannot be carried out. As a result, the identification/tracking cannot be carried out.

SUMMARY OF THE INVENTION

As described above, with the conventional thunder cloud judgment method, or the thunder cloud observation system which employs the identification/tracking method, a thunder cloud area regionally generating within a cloud which expands at a relatively low altitude, cannot be identified, and such an area cannot be identified/tracked.

An object of the present invention is to provide a thunder cloud observation system capable of identifying a thunder cloud area regionally generated within a cloud which expands at a relatively low altitude, and capable of determining a possibility of striking of a thunderbolt for each regional thunder cloud area by identifying/tracking such an area.

(1) According to the first aspect of the present invention, there is provided a thunder cloud observation system comprising: an arithmetic operation unit for calculating a vertical direction accumulated water content from echo strength data obtained from a climate radar, and calculating an echo peak temperature with reference to altitude-temperature comparison data which is based on high altitude climate data; an area determination portion for determining a precipitation area from the vertical direction accumulated water content and determining a thunder cloud area generated within the precipitation area from the echo peak temperature; and an identification/tracking process unit for identifying/tracking the thunder cloud area determined by the area determination unit.

(2) There is further provided a thunder cloud observation system according to the above item (1), wherein the area determination unit judges an area in which the vertical direction accumulated water content is less than a reference value, to be a cloud-free area, an area in which the water content is at the reference value or higher, to be a precipitation area, and an area within the precipitation area in which an echo peak temperature is at the reference value or less, to be a thunder cloud area.

(3) There is still further provided a thunder cloud observation system according to the item (1), wherein the identification/tracking process unit carries out an identification/tracking of a thunder cloud area obtained for each radar observation by a correlation process in terms of distance and a correlation process in terms of overlapping.

(4) There is still further provided a thunder cloud observation system according to the item (3), wherein the identification/tracking process unit 15 has: a first process step for extracting a thunder cloud area from a judgment result of the area determination unit; a second process step for determining a tracking reference point within the thunder cloud area extracted in the first step; a third process step for forecasting position data of a tracking reference point of a next radar observation with regard to the position data of the tracking reference point determined by the second step; a fourth process step for obtaining a distance between the position of the tracking reference point determined in the second process step and the position of the tracking reference point forecasted in the third process step, and determining that there is a correlation in terms of distance when the obtained distance is smaller than a reference value; a fifth process step for moving in parallel a shape pattern of the thunder cloud area at the immediate previous observation, extracted in the first process step so that the tracking reference point thereof is set at the forecasted tracking reference point of the immediate previous observation obtained in the third process step so as to obtain an overlapping area with regard to a shape pattern of a latest thunder cloud extracted in the first process step, and determining that there is a correlation in terms of overlapping if the obtained area is larger than a reference area; and a sixth process step for carrying out an identification of a thunder cloud area from a distance correlation determination result and an overlapping correlation determination area obtained in the fourth and fifth process steps.

(5) According to the second aspect of the present invention, there is provided a thunder cloud observation system comprising: an arithmetic operation unit for calculating a vertical direction accumulated water content from echo strength data obtained from a climate radar, and calculating an echo peak temperature with reference to altitude-temperature comparison data which is based on high altitude climate data; an area determination portion for determining a precipitation area from the vertical direction accumulated water content and determining a thunder cloud area generated within the precipitation area from the echo peak temperature; and a development/decline state judgment unit for judging a possibility of striking of a thunderbolt by judging a development/decline period of the thunder cloud area determined by the area determination unit.

(6) There is further provided a thunder cloud observation system according to the item (5), wherein the area determination unit judges an area in which the vertical direction accumulated water content is less than a reference value, to be a cloud-free area, and an area in which the water content is at the reference value or higher, to be a precipitation area, and determines a thunder cloud area generated in the precipitation area, which is finely divided in a plurality of portions by comparing the echo peak temperature within the precipitation area with a plurality of reference temperatures; and the development/decline state judgment unit extracts a developing nucleus portion having a high echo strength and a high echo peak temperature from the thunder cloud area divided in a plurality of portions in the area determination unit, judges each of the finely divided portions of the thunder cloud area separately whether it is in development or decline state from the chronological data obtained for each one of the nuclei, and determines a time and a position where there is a high possibility of striking of a thunderbolt from the development/decline judgment.

(7) There is still further provided a thunder cloud observation system according to the item (6), wherein the development/decline state judgment unit has: a first process step for extracting a thunder cloud area as a nucleus from a judgment result of the area determination unit; a second process step for assigning a preliminary number to one or more nuclei extracted in the first step; a third process step for obtaining parameter data necessary for judgment of striking of a thunderbolt with regard to each of the nuclei to which preliminary numbers are assigned in the second; a fourth process step for making a correlation judgment by comparing data of a latest nucleus obtained in the third process step and data of a nucleus obtained in an immediate previous observation; a fifth process step for replacing the preliminary number assigned in the second process step with an immediate previous number of the nucleus which is judged to be correlated in the fifth step; and a sixth process step for judging separately each of the nuclei processed in the sixth step, as to a development/decline state by monitoring an increase/decrease in thunder judgment parameter data; the sixth process step being characterized in that data used as thunder judgment parameter is extracted, and a nucleus in which the parameter thereof was once at a level of a reference value or higher, was lowered to a level lower than the reference level, is judged to be in a decline state.

In the thunder cloud observation system having the structure (1), not only the judgment of a thunder cloud is made for each cloud, but also a precipitation area within a cloud is detected on the basis of the vertical direction accumulated water content and a thunder cloud area generated within the precipitation area is identified on the basis of the echo peak temperature; therefore, even for a cloud largely expanding at a low altitude, a thunder cloud area developing in such a cloud can be accurately detected, and a place in which the striking of a thunderbolt is likely to occur, can be specified. Further, the movement forecast and identification of a thunder cloud are carried out not on a precipitation area largely expanding within a radar coverage area, but, more specifically, on a thunder cloud area which is relatively easily observed as a mass, and therefore the tracking reference point can be easily determined, thus making it possible to achieve a highly accurate identification/tracking process.

The item (2) recites a specific structure of the area determination unit, a cloud-free area and a precipitation area are distinguished from each other by comparing the vertical direction accumulated water content with the reference value, and a thunder cloud area is identified by comparing the echo peak temperature with the reference value in the precipitation area.

The item (3) recites a specific structure of the identification/tracking process unit, which carries out the identification/tracking of a thunder cloud area from the results of two correlation processes in terms of distance and overlapping, thus improving the accuracy of the process.

The item (4) recites a flow of the process of the identification/tracking process unit of the item (3). Further, a thunder cloud area is extracted from the judgment result of the area determination unit, and a tracking reference point is determined within the thunder cloud area extracted. From the position data of the determined tracking reference point, the position data of the tracking reference point at the next radar observation is forecasted, and the distance between the position of the latest tracking reference point and the position of the immediate previous tracking reference point, is obtained. When this distance is smaller than the reference value, it is judged that there is a correlation in terms of distance, thus performing a distance correlation process. Further, the shape pattern of the thunder cloud area obtained in the immediate previous observation so that the tracking reference point thereof is set at the forecasted tracking reference point of the immediate previous observation obtained in the third process step (S4), in order to obtain the overlapping area with regard to the shape pattern of the latest thunder cloud area. It is determined that there is a correlation in terms of overlapping if the obtained area is larger than the reference value, thus performing an overlapping correlation process. The identification of a thunder cloud area is carried out on the basis of both the distance correlation determination result and the overlapping correlation determination result, thus improving the accuracy of the identification.

The thunder cloud observation system according to the above item (5), in similar to the item (1), not only simply carries out the judgment of a thunder cloud as for each cloud, but also detects a precipitation area within the cloud on the basis of the vertical direction accumulated water content, and identifies a thunder cloud area generated within the precipitation area on the basis of the echo peak temperature. With this constitution, it is able to accurately detect a thunder cloud area which develops in a cloud largely expanding at a low altitude, and therefore a place where the striking of a thunderbolt is likely to occur, can be specified. Further, the possibility of the striking of a thunder with regard to a thunder cloud area can be determined from the development/decline period, making it possible to provide a more accurate thunderbolt forecast.

The item (6) recites a detailed constitution of the judgment of the development/decline period of a thunder cloud area, in which a thunder cloud area generated in the precipitation area is finely divided in a plurality of portions by comparing the echo peak temperature within the precipitation area with a plurality of reference temperatures, a developing nucleus portion having a high echo strength and a high echo peak temperature from the thunder cloud area divided in a plurality of portions, is extracted, each of the finely divided portions of the thunder cloud area separately judged whether it is in development or decline state from the chronological data obtained for each one of the nuclei, and the area which is in the decline period is judged to be of a high possibility of the striking of a thunder.

The item (7) recites a flow of the process of the development/decline state judgment unit. First, a strong thunder cloud area is extracted as a nucleus from a judgment result of the area determination unit, and a preliminary number is assigned to one or more nuclei extracted. Next, parameter data necessary for judgment of striking of a thunderbolt with regard to each of the nuclei to which preliminary numbers are assigned are successively obtained, and a correlation judgment is made by comparing data of the latest nucleus obtained in the latest observation and the data of a nucleus obtained in an immediate previous observation. Subsequently, the preliminary number assigned in the second process step is replaced with an immediate previous number of the nucleus which is judged to be correlated, and each of the nuclei is judged in terms of the development/decline state separately on the basis of an increase/decrease in the thunder judgment parameter data. More specifically, the data of the thunder judgment parameter is extracted, and a nucleus in which the parameter thereof was once at the level of the reference value or higher, was lowered to the level lower than the reference level, is judged to be in a decline state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will now be described in detail with reference to accompanying drawings.

Figure 1:
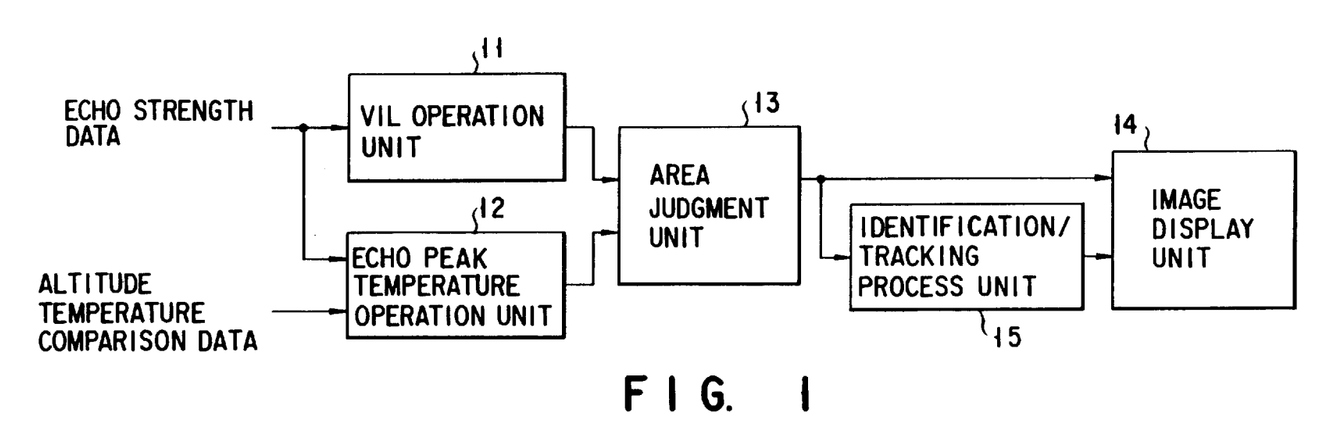
FIG. 1 is a block diagram showing the structure of a thunder cloud observation system according to the first embodiment of the present invention.

FIG. 1 shows the structure of a thunder cloud observation system according to the first embodiment of the present invention, and echo strength data obtained in each observation by a climate radar and an altitude-temperature (Z-T) comparison data obtained from high atmosphere climate data are supplied to the system as input data. The echo strength data is mesh data of the echo strength value according to the precipitation amount (to be called as precipitation strength value hereinafter) converted into a coordinate system of an X-axis, Y-axis and Z-axis which cross normal to each other.

The echo strength data is supplied to a VIL mathematical operation unit 11. The VIL mathematical operation unit 11 serves to obtain a vertical direction accumulation water content (VIL) by accumulating the strength values of the precipitation amounts in the mesh unit in the vertical (Z-axis) direction, regarding the echo strength data.

The echo strength data is supplied to the echo peak temperature mathematical operation unit 12 along with the altitude-temperature comparison data. The echo peak temperature arithmetic operation unit 12 serves to obtain an echo peak altitude from the echo strength data, and to convert the echo peak altitude into an echo peak temperature with reference to the altitude-temperature comparison data. The echo peak temperature data is supplied to the area determination unit 13 along with VIL data obtained by the VIL arithmetic operation unit 11.

Figure 2:
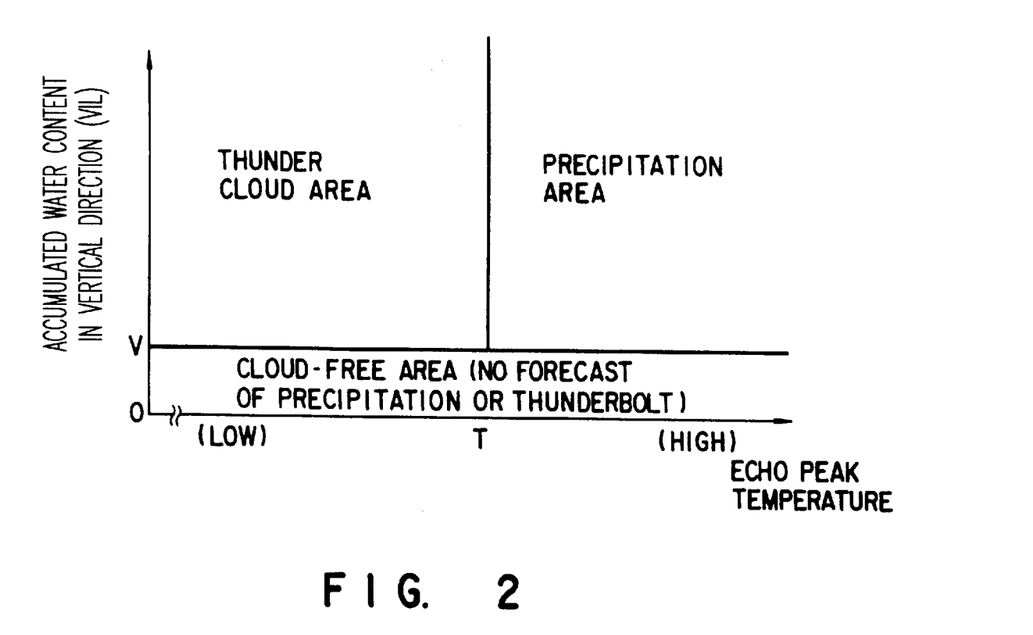
FIG. 2 is a diagram showing areas based on which a judgment is made, used for an area determination unit of the embodiment.
Figure 3:
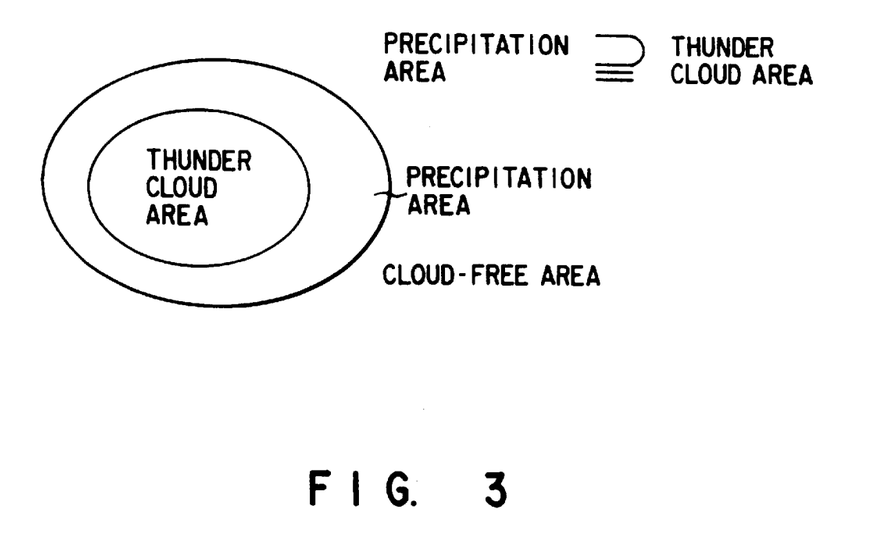
FIG. 3 is a diagram showing the state of an image display of the embodiment.

The area determination unit 13 judges an area the data of which is less than the reference value V to be a cloud-free area, and an area the VIL data of which reaches the reference value V to be a precipitation area, and a precipitation area the echo peak temperature of which is no higher than the reference value T to be a thunder cloud area (see FIG. 2). The judgment result is sent to an image display unit 14, where its image is displayed as shown in FIG. 3, and sent to the identification/tracking process unit 15.

Figure 4:
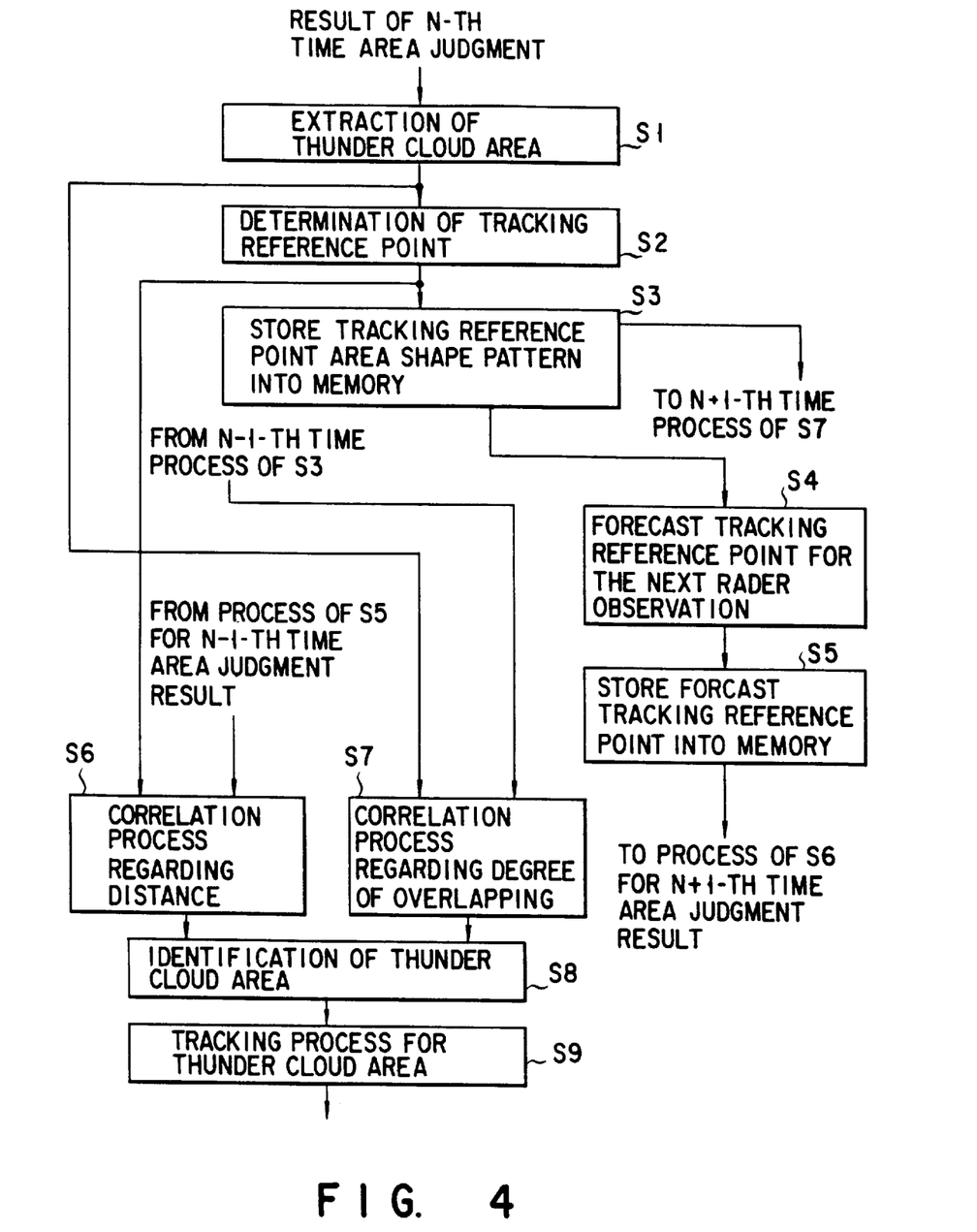
FIG. 4 is a flowchart illustrating a specific process control of the identification/tracking processing unit of the embodiment.

The identification/tracking process unit 15 carries out a process as specified in FIG. 4.

First, a thunder cloud area is extracted from the judgment result of the area determination unit 13 (step S1), a tracking reference point is determined in the area (step S2) and the reference point is stored in a memory along with its area shape pattern (step S3). Examples of the tracking reference point are the center of a thunder cloud area expanding in an X-Y plane, the gravity center of a thunder cloud area weighted by the precipitation strength, and the mesh position at the maximum value of the precipitation strength. The position data of the tracking reference point is set to (XG, YG).

With regard to the position data (XG, YG) of the tracking reference point, a movement thereof is forecasted to predict the position data (XG', YG') of the tracking reference point of the next radar observation (step S4), and the position data is stored in the memory (step S5). Examples of the movement forecast method are the α-β filtering method and the linear extrapolation method.

Subsequently, a correlation between the position data (XG, YG) of the tracking reference point determined in step S2 and the forecasted position data (XG', YG') obtained in the immediate previous radar observation, in regard with the distance, is judged (step S6).

Figure 5:
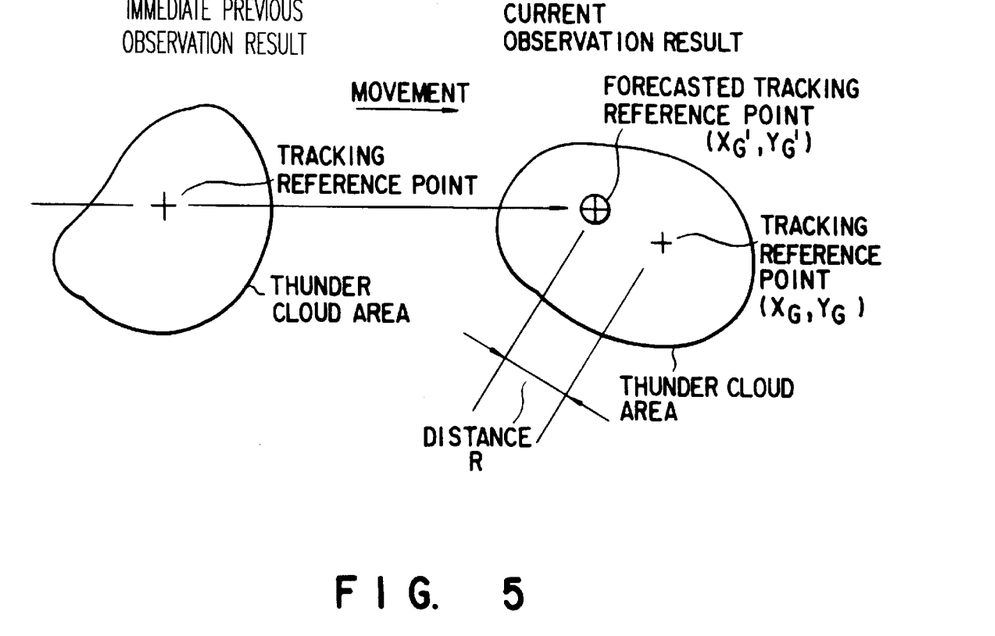
FIG. 5 is a diagram illustrating a distance correlation judgment process of the embodiment.

The above-described process is illustrated in FIG. 5. More specifically, in the distance correlation judgment process, a distance R between the position of the tracking reference point (XG, YG) of the latest data and the position of the tracking reference point (XG', YG') forecasted from the previous observation data is obtained, and only in the case where the distance R is smaller than the reference (threshold) value Rref, it is judged that "there is a correlation".

Further, the thunder cloud area shape pattern in the immediate previous observation, which was stored in step S3, is transferred in a parallel manner to the tracking reference point forecasted position of the immediate previous observation stored in step S5, and a correlation judgment is made in terms of the degree of overlapping with the shape pattern of the latest thunder cloud area extracted in step S1 (step S7).

Figure 6:
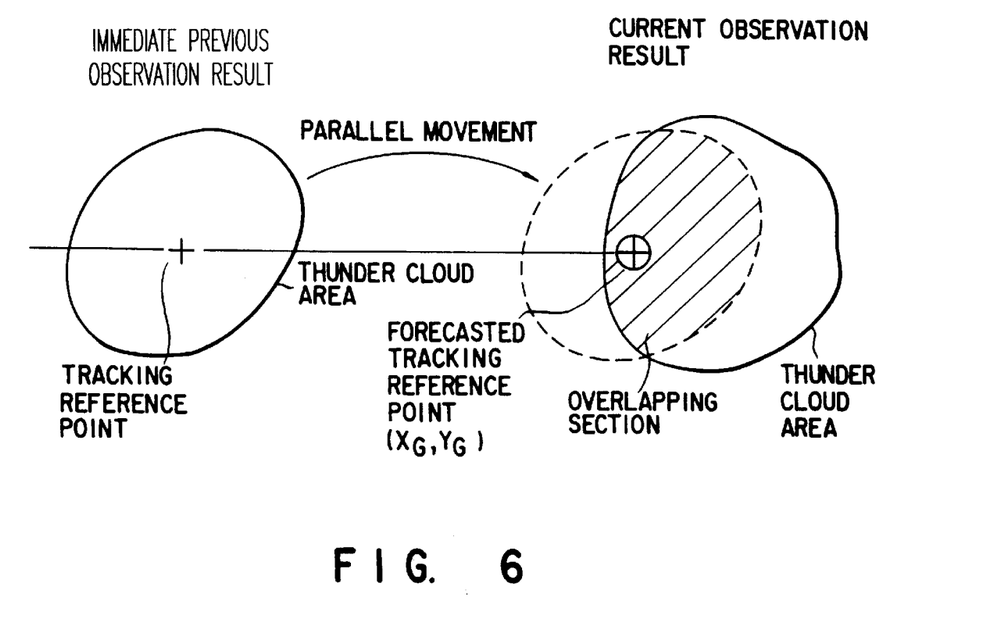
FIG. 6 is a diagram illustrating an overlapping correlation judgment process of the embodiment.

The above-described process is illustrated in FIG. 6. More specifically, in the overlapping correlation judgment process, the thunder cloud area shape pattern observed in the immediate previous observation is transferred in parallel to the tracking reference point forecasted position, and the area of the overlapping portion with respect to the thunder cloud area shape pattern of the current observation, is obtained. Only in the case where the overlapping area is larger than the reference value, it is judged that "there is a correlation".

Lastly, the distance correlation judgment result and the overlapping judgment result obtained in the steps S6 and S7, the identification of the thunder cloud area is carried out (step S8). More specifically, in the case where it is judged that "there is a correlation" in both steps S6 and S7, it is determined that the thunder cloud area currently extracted and that extracted in the immediate previous observation are identical to each other. Alternatively, in the case where it is judged that "there is a correlation" in either one of the steps S6 and S7, it is determined that the thunder cloud area currently extracted is a newly generated thunder cloud area. The identification judgment result is output as thunder cloud area history data, and further sent to the image display unit 14, where the data is subjected to a follow-up (tracking) process, for example, the classification of thunder cloud areas by coloring (step S9).

In other words, with the thunder cloud observation system having the above constitution, the judgment as to whether or not a cloud is a thunder cloud is made simply for each cloud, but the precipitation area within a cloud is identified by VIL data, and further the thunder cloud area generated within the precipitation area is identified from the echo peak temperature. Then, the image thereof is displayed on the display. Consequently, for a cloud widely expanding at a low altitude, a thunder cloud area which develops within the cloud can be accurately detected, and a place with a high possibility of the striking of a thunderbolt can be specified.

The movement forecast and identification of a thunder cloud is carried out not on a precipitation area largely expanding within the radar coverage area, but more specifically, on a thunder cloud area, which can be detected relatively easily as a mass. Therefore, the tracking reference point can be easily determined, and the identification/tracking process can be performed at a high accuracy.

In the case where it is judged whether or not there is a correlation with respect to previous observation data, not only the correlation in terms of the distance between the forecasted position of the tracking reference point and the position of the current tracking reference point, but also the correlation in terms of the degree of overlapping with regard to the current thunder cloud area shape pattern is judged by transferring in parallel the previous thunder cloud area shape pattern to a forecasted position. Thus, the identification is carried out from the both results of the above correlation processes. Consequently, the identification of a cloud (especially, the thunder cloud area thereof) which moves at a high speed can be carried out at a high accuracy.

According to the thunder cloud observation system having the above-described constitution, it is possible to identify a thunder cloud area of a cloud which appears in the Japan Sea side area in winter, and also the area can be identified/tracked at a high accuracy. Therefore, various kinds of data necessary for determining the development/decline of a thunder cloud area can be obtained successively in a chronological order, and therefore the striking of a thunderbolt can be forecasted at a high possibility.

Figure 7:
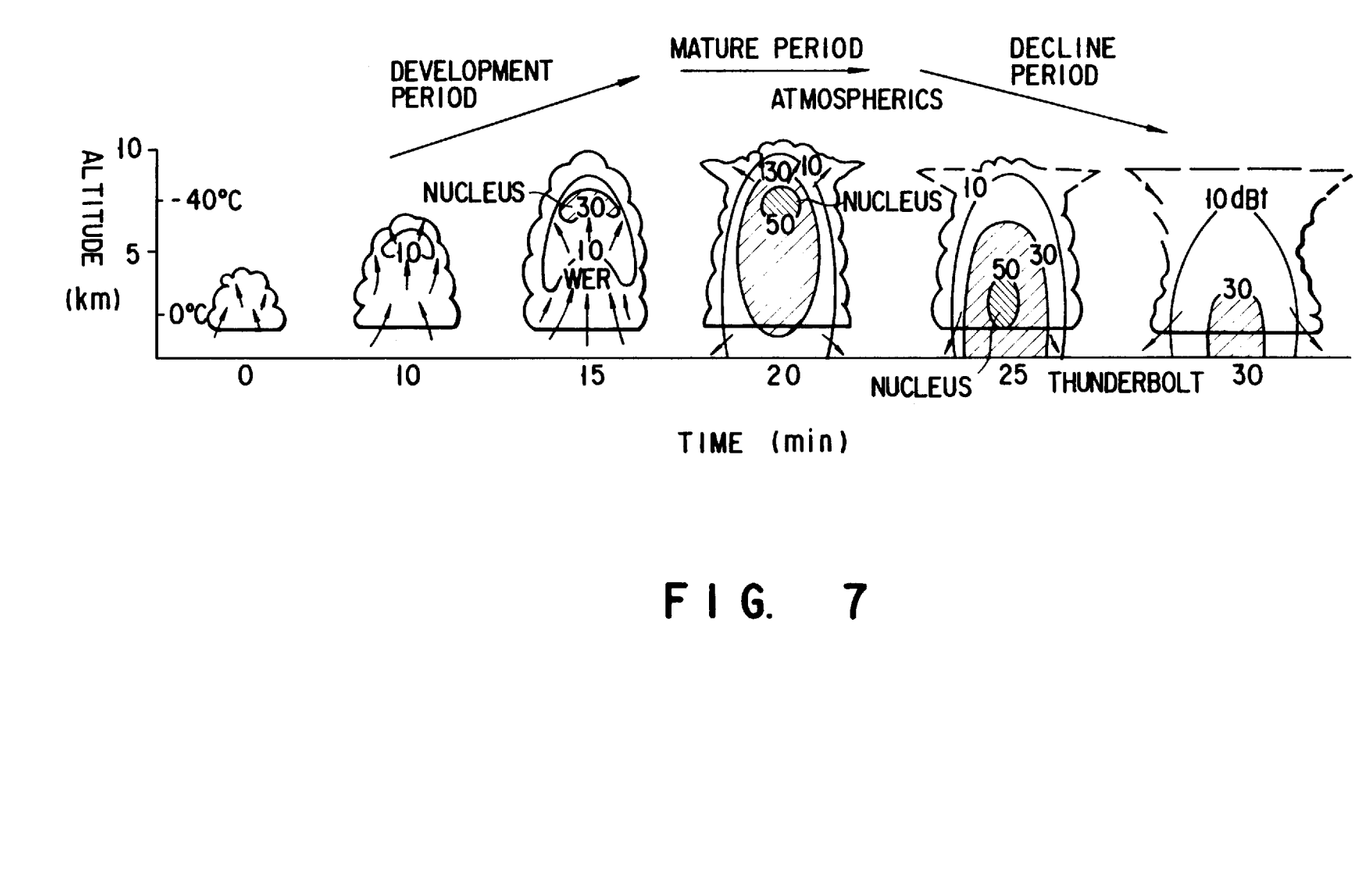
FIG. 7 is a diagram illustrating the development and decline of a thunder cloud.

Incidentally, it is known that a thunder cloud, as can be seen in FIG. 7, can be categorized into those of the development period, the mature period and the decline period. In many cases, the striking of a thunderbolt takes places in the last half of the mature period to the decline period as the nucleus (the portion where the echo strength is particularly high) descends from the upper section of the cloud.

In the development period, there is still much time before the striking of a thunderbolt actually takes place, the echo strength is still weak, and the echo peak altitude is still low, and therefore it may be judged as "week thunder". In contrast, the decline period is the period when the striking of a thunderbolt on the ground is most likely to occur. Therefore, this decline period is the period when it is judged as "strong thunder" in spite of the fact that the echo strength is weakened as the nucleus descends and the echo peak altitude is lowered.

In addition to the judgment of a thunder cloud area by the above echo strength and the echo peak temperature, the development/decline of the thunder cloud area is judged, thus making it possible to obtain a thunder strike occurrence possibility at a high accuracy.

Figure 8:
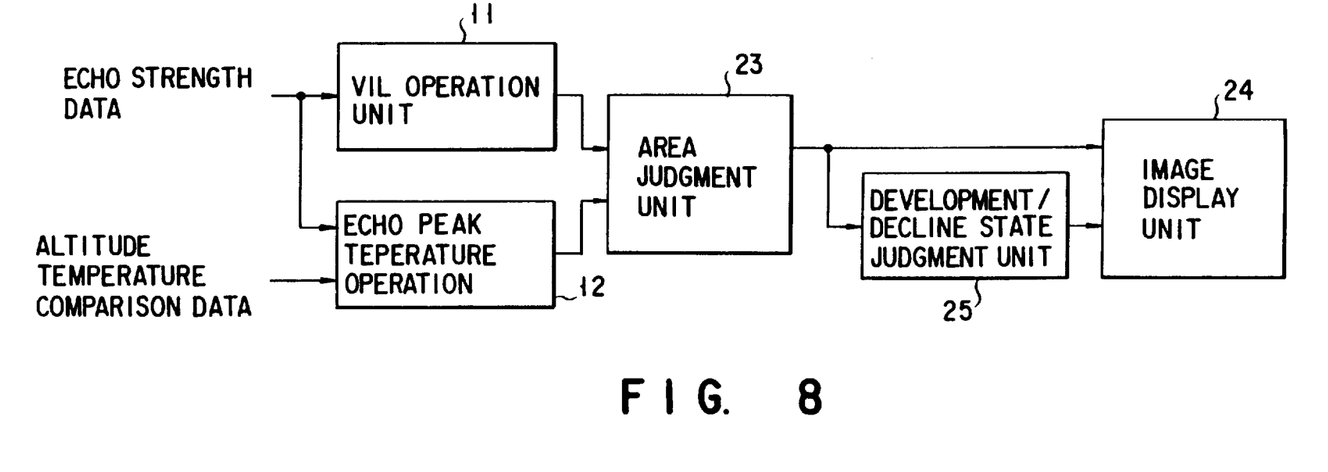
FIG. 8 is a block diagram showing a thunder cloud observation system according to the second embodiment of the present invention.

FIG. 8 illustrates the second embodiment of the present invention, and shows the structure of the system in which a thunder cloud area is further divided in accordance with the periods of the development/decline. In this figure, the same structural members as those of FIG. 1 are designated by the same reference numerals, and the different parts will now be mainly discussed.

Figure 9:
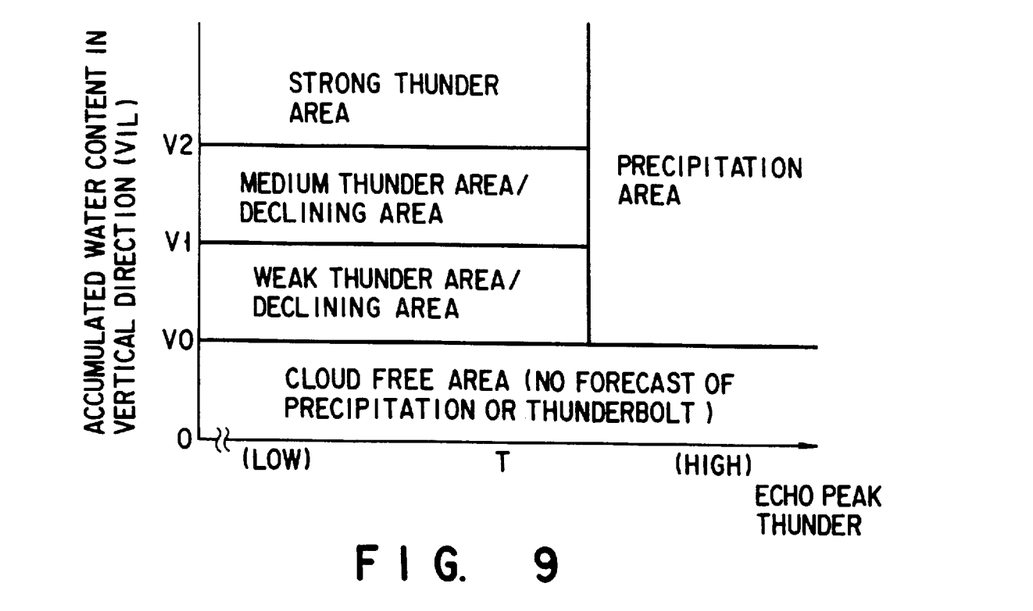
FIG. 9 is a diagram showing areas based on which a judgment is made, used for an area determination unit of the embodiment.
Figure 10:
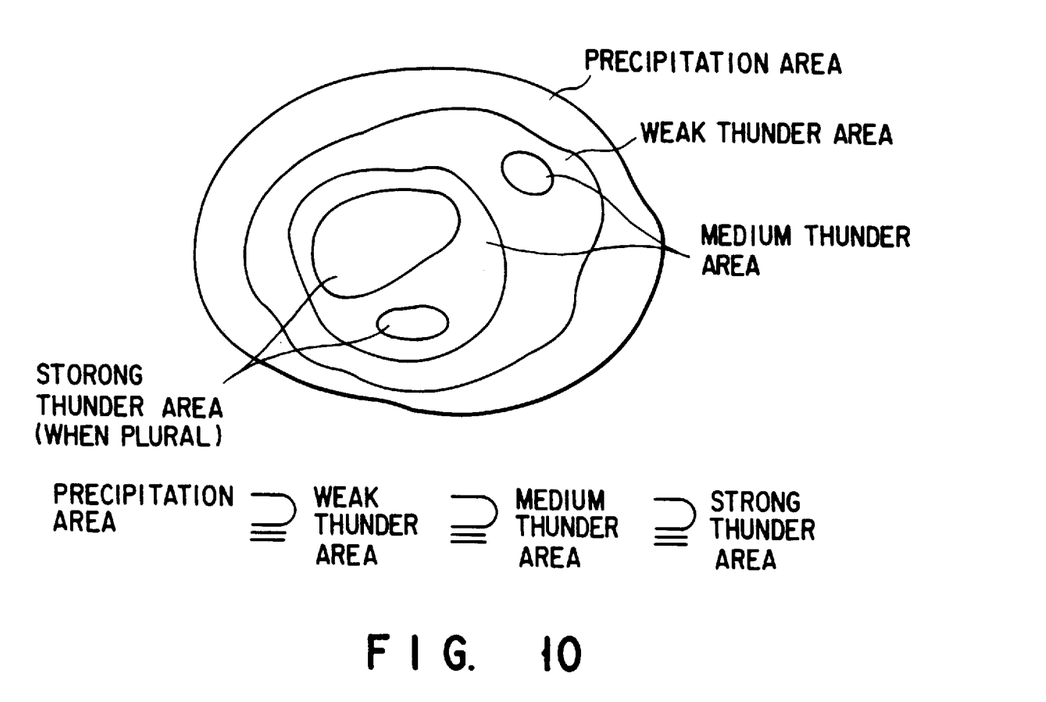
FIG. 10 is a diagram showing the state of an image display of the embodiment.

First, the area determination unit 23 judges an area where VIL data is less than a reference value V0 to be a cloud free area, and an area where the data is no less than the reference value V0 to be a precipitation area, in accordance with the classification illustrated in FIG. 9. Next, the unit 23 judges an area within the precipitation area, where the echo peak temperature is at the reference value T or less, to be a thunder cloud area. Subsequently, VIL data D is compared with reference values V1 and V2, and if V0<D<V1 is satisfied, it is judged to be a "weak thunder area", if V<D<V2 is satisfied, it is judged to be a "medium thunder area", and if V2<D is satisfied, it is judged to be a "strong thunder area". The result of a judgment is sent to the image display unit 24, where the image thereof is displayed as can be seen in FIG. 10, and also to a development/decline state determination unit 25.

Figure 11:
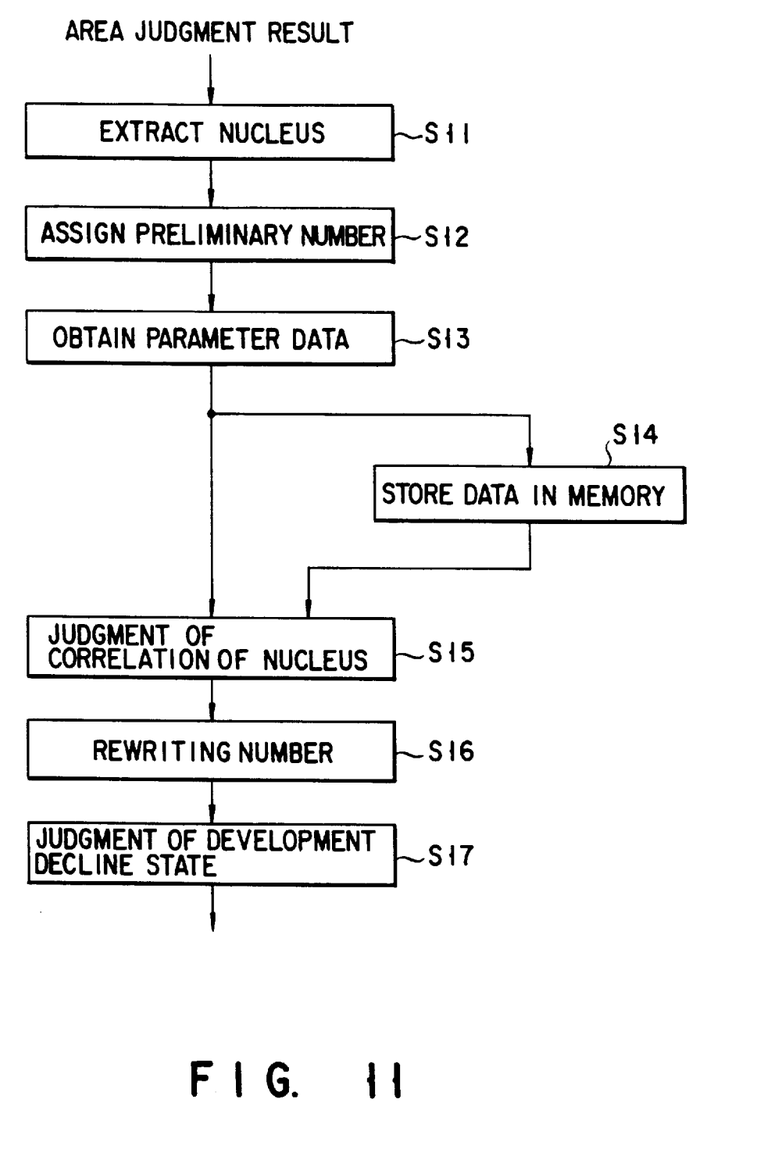
FIG. 11 is a flowchart illustrating a specific process control of the identification/tracking processing unit of the embodiment.

The development/decline state determination unit 25 carries out the following process as specifically shown in FIG. 11.

First, a strong thunder area is extracted as a nucleus from the judgment result of the area determination unit 23 (step S11), a preliminary number is assigned to each of one or more strong thunder areas extracted (step S12), parameter data necessary for the judgment of striking of a thunderbolt is obtained for each nucleus (step S13) and the data is stored in the memory as the comparison data for the next observation (step S14).

Subsequently, the data of the nucleus obtained in step S13 is compared with the data of the nucleus obtained in the immediate previous observation in step S14, so as to carry out a judgment of a correlation therebetween (step S15). With regard to a series of those nuclei which are judged to be correlated with each other, the preliminary number currently assigned in step S12 is replaced with the previous number (step S16).

Further, each of the nuclei is independently judged in terms of the development/decline state by monitoring an increase/decrease in the parameter data of the thunderbolt judgment (step S17). In this judgment, the data of the thunderbolt judgment parameter is extracted, and a nucleus in which the parameter data thereof, which was once at a level of the reference value or higher, lowered to a level lower than the reference value, is judged to be in the decline period.

This judgment result is sent to the image display unit 24. The image display unit 24 displays the area judged to be in the decline period by the development/decline state determination unit 25, as a decline area even if the judgment result from the area determination unit 23 is a medium thunder area or a weak thunder area.

That is, with the thunder cloud observation system having the above structure, a developing nucleus portion having a high echo strength and a high echo peak altitude is extracted, and the identification/tracking of the nucleus is carried out on the data of each radar observation. Thus, by observing the thunder judgment parameter data in the chronological order regarding each nucleus, the time and place, having a high possibility of the striking of a thunderbolt, are determined. In particular, as an increase and decrease in the obtained parameter data in the chronological order is observed, the presence of a nucleus (mature period) and the descending of a nucleus (decline period) are separately judged. With this constitution, a misjudgment in which a wide cloud area is judged to be a thunder cloud area or a development period and a decline period are both judged to be weak thunder areas, can be avoided.

It should be noted that the present invention is not limited to the above-described embodiments, but can be, naturally, remodeled into various versions as long as the essence of the invention remains in the scope of the present invention.

As described, according to the present invention, a thunder cloud observation system capable of identifying even a thunder cloud which is regionally generated within a cloud expanding at a relatively low altitude can be identified, and determining a possibility of the striking of a thunder for each regional thunder cloud area by identifying/tracking the area.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A thunder cloud observation system comprising:

an arithmetic operation unit for calculating a vertical direction accumulated water content from echo strength data obtained from a climate radar, and calculating an echo peak temperature with reference to altitude-temperature comparison data which is based on high altitude climate data;

an area determination portion for determining a precipitation area from said vertical direction accumulated water content and determining a thunder cloud area generated within the precipitation area from said echo peak temperature; and an identification/tracking process unit for identifying/tracking the thunder cloud area determined by the area determination unit, wherein said area determination unit judges an area in which said vertical direction accumulated water content is less than a reference value, to be a cloud-free area, an area in which said water content is at the reference value or higher, to be a precipitation area, and an area within the precipitation area in which an echo peak temperature is at the reference value or less, to be a thunder cloud area.

2. A thunder cloud observation system according to claim 1, further comprising:

a development/decline state judgment unit for judging a possibility of striking of a thunderbolt by judging a development/decline period of the thunder cloud area determined by the area determination unit.

3. A thunder cloud observation system comprising:

an arithmetic operation unit for calculating a vertical direction accumulated water content from echo strength data obtained from a climate radar, and calculating an echo peak temperature with reference to altitude-temperature comparison data which is based on high altitude climate data;

an area determination portion for determining a precipitation area from said vertical direction accumulated water content and determining a thunder cloud area generated within the precipitation area from said echo peak temperature; and an identification/tracking process unit for identifying/tracking the thunder cloud area determined by the area determination unit, wherein said identification/tracking process unit carries out an identification/tracking of a thunder cloud area obtained for each radar observation by a correlation process in terms of distance and a correlation process in terms of overlapping identified cloud areas.

4. A thunder cloud observation system according to claim 3, wherein said identification/tracking process unit has:

a first process step for extracting a thunder cloud area from a judgment result of said area determination unit;

a second process step for determining a tracking reference point within the thunder cloud area extracted in the step;

a third process step for forecasting position data of a tracking reference point of a next radar observation with regard to the position data of the tracking reference point determined by the step;

a fourth process step for obtaining a distance between the position of the tracking reference point determined in the second process step and the position of the tracking reference point forecasted in the third process step, and determining that there is a correlation in terms of distance when the obtained distance is smaller than a reference value;

a fifth process step for moving in parallel a shape for the thunder cloud area at the immediate previous observation, extracted in the first process step so that the tracking reference point thereof is set at the forecasted tracking reference point of the immediate previous observation obtained in the third process step so as to obtain an overlapping area with regard to a shape pattern of a latest thunder cloud extracted in the first process step, and determining that there is a correlation in terms of overlapping if the obtained area is larger than a reference area; and a sixth process step for carrying out an identification of a thunder cloud area from a distance correlation determination result and an overlapping correlation determination area obtained in the fourth and fifth process steps.

5. A thunder cloud observation system comprising:

an arithmetic operation unit for calculating a vertical direction accumulated water content from echo strength data obtained from a climate radar, and calculating an echo peak temperature with reference to altitude-temperature comparison data which is based on high altitude climate data;

an area determination portion for determining a precipitation area from said vertical direction accumulated water content and determining a thunder cloud area generated within the precipitation area from said echo peak temperature; and a development/decline state judgment unit for judging a possibility of striking a thunderbolt by judging a development/decline period of the thunder cloud area determined by the area determination unit, wherein said area determination unit judges an area in which said vertical direction accumulated water content is less than a reference value, to be a cloud-free area, and an area in which said water content is at the reference value or higher, to be a precipitation area, and determines a thunder cloud area generated in the precipitation area, which is finely divided in a plurality of portions by comparing the echo peak temperature within the precipitation area with a plurality of reference temperatures; and said development/decline state judgment unit extracts a developing nucleus portion having a high echo strength and a high echo peak temperature from the thunder cloud area divided in a plurality of portions in said area determination unit, judges each of the finely divided position of the thunder cloud area separately whether it is in development or decline state from the chronological data obtained for each one of the nuclei, and determines a time and a position where there is a high possibility of striking of a thunder bolt from the development/decline judgment.

6. A thunder cloud observation system according to claim 5, wherein said development/decline state judgment unit has:

a first process step for extracting a thunder cloud area as a nucleus from a judgment result of said area determination unit;

a second process step for assigning a preliminary number to one or more nuclei extracted in the step;

a third process step for obtaining parameter data necessary for judgment of striking of a thunderbolt with regard to each of the nuclei to which preliminary numbers are assigned in the step;

a fourth process step for making a correlation judgment by comparing data of a latest nucleus obtained in the third process step and data of a nucleus obtained in an immediate previous observation;

a fifth process step for replacing the preliminary number assigned in the second process step with an immediate previous number of the nucleus which is judged to be correlated in the fifth step; and a sixth process step for judging separately each of the nuclei processed in the sixth step, as to a development/decline state by monitoring an increase/decrease in thunder judgment parameter data;

said sixth process step being characterized in that data used as thunder judgment parameter is extracted, and a nucleus in which the parameter thereof was once at a level of a reference value or higher, was lowered to a level lower than the reference level, is judged to be in a decline state.

* * * * *